United States Patent
Abhyankar et al.

(10) Patent No.: US 12,190,169 B2
(45) Date of Patent: Jan. 7, 2025

(54) SYSTEMS AND METHODS FOR CONFIGURATION OF CLOUD-BASED DEPLOYMENTS

(71) Applicant: Accenture Global Solutions Limited, Dublin (IE)

(72) Inventors: Atul Abhyankar, Pune (IN); Suresh Kanjur Manakkal, Bangalore (IN); Payal Panda, Bangalore (IN); Shaista Firdose, Bangalore (IN); Vijay Parthasarathy, Bangalore (IN); Hetal Mukesh Karelia, Thane (IN); Samanwita Majumdar, Kolkata (IN); Subhasish Das, Kolkata (IN); PremS Ramani, Bangalore (IN); Sujatha Pragalanathan, Tirupattur District (IN); Apurva Arora, Delhi (IN)

(73) Assignee: Accenture Global Solutions Limited, Dublin (IE)

( * ) Notice: Subject to any disclaimer, the term of this patent is extended or adjusted under 35 U.S.C. 154(b) by 471 days.

(21) Appl. No.: 17/566,999

(22) Filed: Dec. 31, 2021

(65) Prior Publication Data
US 2023/0214275 A1     Jul. 6, 2023

(51) Int. Cl.
*G06F 9/44* (2018.01)
*G06F 9/50* (2006.01)
(Continued)

(52) U.S. Cl.
CPC ........ *G06F 9/5077* (2013.01); *G06F 11/3442* (2013.01); *G06N 3/045* (2023.01)

(58) Field of Classification Search
CPC ..................................................... G06F 9/5007
(Continued)

(56) References Cited

U.S. PATENT DOCUMENTS 10,484,242 B2    11/2019  Chauhan et al.
2020/0019794 A1*  1/2020  Engelcke .............. G06N 3/08
2021/0201130 A1   7/2021  Lee et al.

OTHER PUBLICATIONS

European Patent Office, Communication, Extended European Search Report issued for European Patent Application No. 22212984.3, dated May 15, 2023, 10 pages.

(Continued)

*Primary Examiner* — Timothy A Mudrick (57) ABSTRACT

Aspects of the present disclosure provide systems, methods, and computer-readable storage media that support configuration of cloud-based functionality. A configuration device is provided and includes a data processing module, a modelling module, and a loading module. The data processing module provides functionality for compiling information for use in configuring the cloud-based functionality in a requirements compliant manner. The modelling module may include various machine learning modules configured to evaluate configuration workbooks for compliance with requirements specified by a user. The modelling module may output recommendations for improving compliance of the configuration workbooks and appropriate changes may be made. The loading module may be configured to obtain templates applicable to the cloud-based functionality being configured and to extract appropriate data from the (updated) configuration workbooks. The extracted data may then be loaded into the obtained templates for use in configuring the cloud-based functionality in a regulatory compliant manner.

20 Claims, 3 Drawing Sheets

(51) Int. Cl.
  *G06F 11/34* (2006.01)
  *G06N 3/045* (2023.01)
(58) Field of Classification Search
  USPC .............................................. 718/1
  See application file for complete search history.

(56) References Cited

OTHER PUBLICATIONS

Baheti, P. "What is Transfer Learning? [Examples & Newbie-Friendly Guide]," Retrieved from the Internet: https://www.v7labs.com/blog/transfer-learning-guide, [retrieved on May 3, 2023], dated Oct. 12, 2021, 30 pages.

* cited by examiner

FIG. 1

| 200 → | 202A | 202B | 202C | 202D | 202E |
|---|---|---|---|---|---|
| 210 → | 212 | 214 | ... | 216 | 218 |
| 220 → | 222 | 224 | ... | 226 | 228 |
| 230 → | 232 | 234 | ... | 236 | 238 |
| 240 → | 242 | 244 | ... | 246 | 248 |

FIG. 2A

| 200' → | 202A | 202B | 202C | 202D | 202E |
|---|---|---|---|---|---|
| 210 → | 212 | 214 | ... | 216 | 218 |
| 220 → | 222 | 224 | ... | 226' | 228 |
| 230 → | 232 | 234 | ... | 236 | 238 |
| 240 → | 242 | 244 | ... | 246' | 248' |

SYSTEMS AND METHODS FOR CONFIGURATION OF CLOUD-BASED DEPLOYMENTS

TECHNICAL FIELD

The present disclosure relates generally to data processing and integration systems and more specifically to data transformation, configuration, and loading automation techniques for cloud-based deployments driven by machine learning.

BACKGROUND

Technology has increasingly become a tool for bringing about changes to society. For example, a few decades ago it was common for people to not have a personal computer and communications were limited to landline devices. However, advances in network technologies and computer manufacturing presently enable much of the functionality those devices to be provided by portable, handheld devices, such as smartphones, tablet computing devices, and the like. These advancements have enabled communications and computing technologies to proliferate and have changed the way that people work, consume information, and communicate. Cloud computing is another example of a technological advance that is impacting society. Cloud computing environments may provide increased mobility, reduce costs, improve security and quality control, enable systems to be more easily scaled, and other benefits. However, migrating from locally resident computing infrastructure (e.g., servers, local database systems, etc.) to cloud-based system deployments can present a significant challenge.

One reason migration to cloud-based deployments is challenging is that cloud-based systems may include various applications and modules that must be configured during the migration, especially in situations where the applications provided via the cloud are different from those presently utilized by the entity undergoing the migration. Another factor that increases the challenge of such migrations is regulatory compliance, which increases the complexity of the migration and requires additional configuration to be performed, especially where compliance across multiple countries or regulatory jurisdictions is involved. Presently, configuration operations to migrate to cloud-based deployments are performed manually and are very time consuming. For example, an average migration may involve ten (10) complex advanced loads per module (e.g., per application, service, etc.) and each advanced load may take twenty six (26) hours to complete. This results in an estimated manual effort of approximately two hundred and sixty (260) hours per module. Moreover, because the above-described advanced loads are performed manually, they may be error prone and create additional delays and issues during the migration.

SUMMARY

Aspects of the present disclosure provide systems, methods, and computer-readable storage media that support configuration of cloud-based functionality. A configuration device is provided and includes a data processing module, a modelling module, and a loading module. The data processing module provides functionality for compiling a dataset that includes various pieces of information for use in configuring the cloud-based functionality in a manner that complies with one or more sets of requirements. The pieces of information may include loading templates, configuration workbooks, requirements information, mapping data, or other types of information.

The modelling module may include machine learning modules configured to evaluate configuration workbooks for compliance with requirements specified by a user. In an aspect, multiple models may be utilized for compliance analysis. For example, a pre-trained model may be used to perform pre-training on the configuration workbook(s) and then a fine-tuned model may be used to further evaluate the configuration workbook for compliance with applicable requirements. The fine-tuned model may include a portion of the pre-trained model, such as a neural network of the pre-trained model, but may also include additional layers on top of the neural network. Since the neural network comes from the pre-trained model, it may be trained to identify features across a broad spectrum of compliance use cases, enabling the neural network to provide feature identification functionality for the fine-tuned model. The additional layers of the fine-tuned model may be more specific to particular use cases and may therefor serve as classifiers for evaluating compliance with the requirements. The modelling module may also be configured to generate recommendations for improving compliance of the configuration workbooks so that appropriate changes may be made. This process may be repeated until a satisfactory level of compliance is achieved.

The loading module may be configured to extract information from the configuration workbooks and populate loading templates that may then be used to configure cloud-based functionality. The loading module may also be configured to perform validation operations to validate the templates, the data of the workbooks, or other types of validations, and may be used the mapping data to perform various transformation operations on the data. Once the data is validated and the transformations are complete, the loading module may generate a runtime database in which data extracted from the workbooks may be stored. The runtime databases may be used to populate the loading templates for subsequent use in configuring the cloud-based functionality in a regulatory compliant manner.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, and computer-readable storage media that support configuration of cloud-based functionality. A configuration device is provided and provides functionality for compiling information for use in configuring requirements compliant cloud-based functionality. The configuration device may include machine learning modules to evaluate configuration workbooks for compliance with a set of requirements (e.g., government requirements, industry group requirements, self-imposed requirements, etc.) and may enable the configuration workbooks to be modified to improve compliance with the set of requirements. The modifications to the configuration workbooks may be based on recommendations generated by the configuration device based on evaluating the configuration workbooks against the machine learning models. The configuration device also provides functionality for extracting appropriate data from the configuration workbooks and using the extracted data to populate loading templates corresponding to the cloud-based functionality of interest. Once generated, the loading templates may be utilized to configure the cloud-based functionality, which may enable the cloud-based functionality to be brought into compliance with a set of requirements more efficiently than the presently available techniques and may enable more rapid deployment of requirements compliant cloud-based functionality, as described in more detail below.

Figure 1:
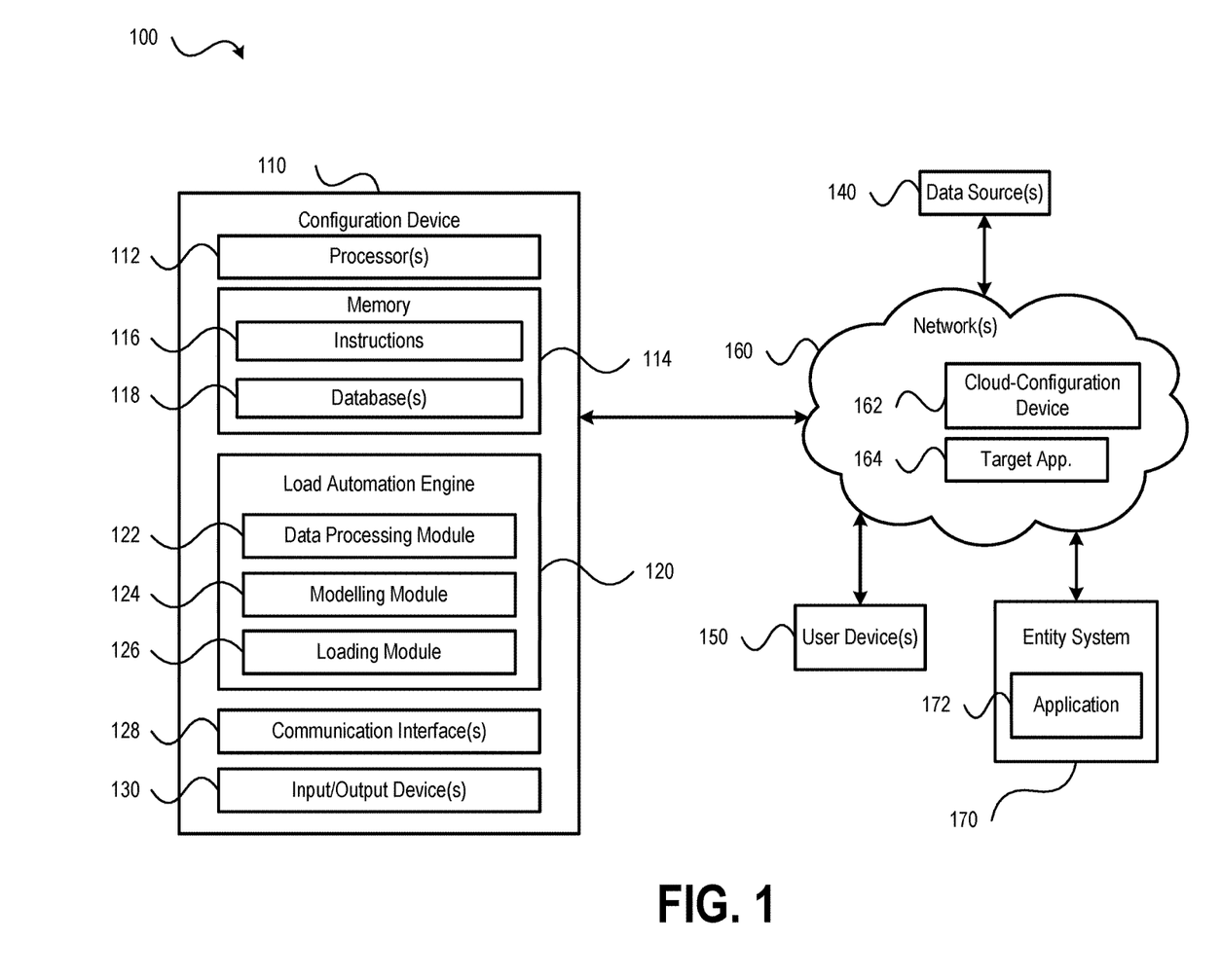
FIG. 1 is a block diagram of a system that supports configuration of cloud-based system according to one or more aspects of the present disclosure.

Referring to FIG. 1, an example of a system that supports configuration of cloud-based systems according to one or more aspects of the present disclosure is shown as a system 100. The system 100 may be configured to leverage machine learning models to verify requirements compliance of configuration workbooks and to provide recommendations for enhancing a level of compliance of the configuration workbooks and/or bringing the configuration workbooks into compliance. Additionally, the system 100 may leverage requirements compliant configuration workbooks to generate advanced loading templates that may be used to configure a cloud-based system or a portion thereof (e.g., applications, modules, and the like). As shown in FIG. 1, the system 100 includes a configuration device 110 communicatively coupled to one or more data sources 140, one or more user devices 150, and one or more entity devices 170 via one or more networks 160. In some implementations, one or more of these devices may be optional (e.g., the one or more data sources 140, the user devices 150, and/or the entity devices 170), or the system 100 may include additional components or configurations, such as cloud-based deployments, shown as cloud configuration device 162 or local deployments (e.g., the functionality of the configuration device 110 may be provided via an application deployed on the user device 150, the entity device 170, or another device), as a non-limiting example.

The configuration device 110 may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The configuration device 110 includes one or more processors 112, a memory 114, a load automation engine 120, one or more communication interfaces 122, and one or more input/output (I/O) devices 124. It is noted that FIG. 1 shows the configuration device 110 including specific components for purposes of illustration, rather than by way of limitation and that configuration devices in accordance with the concepts disclosed herein may include other components if desired. Additionally, it is noted that functionalities described with reference to the configuration device 110 are provided for purposes of illustration, rather than by way of limitation and that the exemplary functionalities described herein may be provided via other types of computing resource deployments. For example, in some implementations, computing resources and functionality described in connection with the configuration device 110 may be provided in a distributed system using multiple servers or other computing devices, or in a cloud-based system using computing resources and functionality provided by a cloud-based environment that is accessible over a network, such as the one of the one or more networks 160. To illustrate, one or more operations described herein with reference to the configuration device 110 may be performed by one or more servers or a cloud-based system, shown in FIG. 1 as cloud-based configuration 162.

The one or more processors 112 may include one or more microcontrollers, application specific integrated circuits (ASICs), field programmable gate arrays (FPGAs), central processing units (CPUs) having one or more processing cores, or other circuitry and logic configured to facilitate the operations of the configuration device 110 in accordance with aspects of the present disclosure. The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the configuration device 110 may be stored in the memory 106 as instructions 116 that, when executed by the one or more processors 112, cause the one or more processors 112 to perform the operations described herein with respect to the configuration device 110, as described in more detail below. Additionally, the memory 114 may be configured to store data and information supporting the operations of the configuration device 110 in one or more databases 118. Illustrative aspects of the one or more databases 118 are described in more detail below.

The one or more communication interfaces 122 may be configured to communicatively couple the configuration device 110 to the one or more networks 160 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). The one or more I/O devices 124 may include one or more display devices, a keyboard, a stylus, one or more touchscreens, a mouse, a trackpad, a microphone, a camera, one or more speakers, haptic feedback devices, or other types of devices that enable a user to receive information from or provide information to the configuration device 110. In some implementations, the configuration device 110 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the configuration device 110.

As shown in FIG. 1, the load automation engine 120 may include a data processing module 122, a modelling module 124, and a loading module 126. The data processing module 122 may be configured to provide functionality for obtaining requirements data from one or more data sources 140 and/or the entity device 170 to obtain data associated with regulatory requirements (e.g., data associated with regulatory requirements), industry requirements (e.g., data associated with industry consortium requirements, industry best practices, etc.), or other types of requirements data and sources. For example, the one or more data sources 140 may be systems associated with various government agencies (e.g., Occupational Safety and Health Administration (OSHA), Equal Employment Opportunity Commission (EEOC), etc.), industry consortiums or groups (e.g., Institute of Electrical and Electronics Engineers (IEEE), Automated Vehicle Safety Consortium™ (AVSC), 3rd Generation Partnership Project (3GPP), etc.), or other organizations and institutions having authority to issue requirements that are imposed or recommended various types of entities (e.g., manufacturer, employers, etc.).

It is noted that the examples above refer to third party authorities (e.g., organizations and institutions that issue requirements imposed on other entities) for purposes of illustration, rather than by way of limitation and that embodiments of the present disclosure may be utilized with other types of requirements. For example, in FIG. 1, an entity device 170, which may be a device associated with a business, a manufacturer, or other form of entity, is shown. The entity associated with the entity device 170 may be voluntarily or mandatorily required to comply with the regulations and requirements issued by the third party authorities described above, and may additional impose requirements on themselves. Such self-imposed requirements may also be obtained by the configuration device 110 using the techniques described herein and utilized in accordance with the concepts described herein. Thus, it is to be understood that the functionality provided by the configuration device 110 is not limited to any particular type of requirements information or any particular type of entity that may create requirements.

The data processing module 122 may be configured to obtain the requirements data from the one or more data sources 140 and/or the entity device 170. For example, the data processing module 122 may periodically probe (e.g., once per hour, day, week, month, etc.) the one or more data sources 140 and/or the entity device(s) 170 to determine whether new or updated requirements information is available. To facilitate automatic probing, the one or more databases 118 may include a requirements retrieval database that stored information specifying the requirements of interest, source data for the requirements of interest (e.g., different ones of the one or more data sources 140 and/or entity device 170 where new or updated versions of the requirements may be obtained), frequency information (e.g., how often the data processing module 122 should perform automatic probing), and the like. The data processing module 122 may utilize the requirements retrieval information to periodically query or probe the sources identified by the source data to determine whether new or update requirements are available. If new or updated requirements are available, the new or updated requirements may be returned to the data processing module 122 in response to the probing. Additionally or alternatively, the data processing module 122 may subscribe to one or more data feeds associated with the one or more data sources 140 and/or the entity device 170, and new or updated requirements information may be automatically distributed to the data processing module 122 as the new or updated requirements information is created. Additionally or alternatively, new or updated requirements information may be provided to the data processing module 122 on-demand. To illustrate, a user may access the functionality provided by the configuration device 110 using a user device 150 and may upload the new or updated information to the configuration device 110.

In yet another additional or alternative way of obtaining requirements information, the one or more databases 118 may include a requirements database (e.g., a database storing requirements obtained by the data processing module 122). When functionality of the configuration device 110 that utilizes requirements information is invoked, the requirements database may be consulted to determine if the requirements information is already stored in the requirements database. If the requirements are not found in the requirements database, the data processing module 122 may obtain the requirements utilizing automatic probing or may prompt the user to provide the requirements using on-demand techniques, as described above. Furthermore, when the requirements are present in the requirements database, the data processing module 122 may be configured to determine whether a version of the requirements present in the requirements database is the correct version (e.g., the version specified by a user when invoking the functionality of the configuration device 110) and may initiate automated or on-demand processes if the correct version is not stored in the requirements database. In some aspects, the data processing module 122 may determine an amount of time that has elapsed since the requirements were last updated and may perform automatic probing if the elapsed amount of time exceeds a threshold amount of time (e.g., 3 months, 6 months, 1 year, or some other period of time).

It is noted that the techniques for obtaining requirements information described above have been provided for purposes of illustration, rather than by way of limitation and that other techniques and mechanisms may be utilized by the configuration device 110 and/or the data processing module 122 to obtain requirements information. Furthermore, it is to be understood that the functionality of the configuration device 110 is not limited to utilizing the most current version of requirements information. For example, while some requirements may be mandatory (e.g., certain government agency issued requirements), other types of requirements (e.g., best practices, etc.) may be optional. For mandatory requirements the most current version of the requirements be utilized by the configuration device 110, but a current or most recent version may not be required for optional requirements specification (e.g., an entity may be reluctant to adopt the latest version of a set of requirements involving industry best practices for a period of time while the investigate the impact that those practices will have on the entity).

In addition to requirements information, the data processing module 122 may be configured to obtain additional types of information from a user (e.g., a user of the user device 140). For example, when the user of user device 140 accesses the configuration device 110 (or the cloud-based configuration device 162), the data processing module 122 may present a graphical user interface, which may prompt the user to enter a user name and password. Once authenticated with the configuration device 110, the graphical user interface may prompt the user to provide various types of information for configuring operations of the configuration device 110, such as credential information, application information, one or more targets, a mode parameter, control parameters, templates, configuration workbooks, mapping data, compliance data, or other pieces of information. The one or more targets may specify one or more applications, modules, services, and the like that are being configured. In an aspect, the one or more targets may be input via a dropdown menu that may be populated with available targets, and the user may select one or more of the targets via the dropdown menu. It is noted that a dropdown menu is provided for purposes of illustration, rather than by way of limitation and that other types of user interface mechanisms may be utilized to capture the target(s) information.

The mode parameter may enable the user to select between different modes of operation of the configuration device 110, such as a validation only mode or an advanced loading mode. In the validation only mode, the configuration device 110 may operate to validate one or more configuration workbooks for compliance with a set of requirements (e.g., the requirements stored in the requirements database). In the advanced loading mode, the configuration device 110 may operate to validate the one or more configuration workbooks for compliance with a set of requirements and may also generate one or more advance loads.

The control parameters may be used to control data interactions between the configuration device 110 and other inputs, such as the configuration workbooks, as well as how parameters configured by the user for executing functionality of the configuration device 110 are stored. For example, the control parameters may enable the user to save all parameters configured for executing compliance functionality of the configuration device 110 in an encrypted file. When utilized, the parameters configured by the user may be stored in a configuration database (e.g., one of the one or more databases 118) in an encrypted manner (e.g., an encrypted file, etc.). Storing the parameters at the configuration device 110 may enable the user to re-run the functionality of the configuration device 110 multiple times without requiring the user to reconfigure the configuration device 110 (e.g., configure the various parameters described above).

The templates may include one or more files that contain blank templates for performing advanced loads. It is noted that while described as "blank" templates, this should not be construed as meaning that the templates do not contain information. Instead, the blank templates include fields that may be populated with appropriate data for performing advanced loads based on other pieces of data provided by the user, such as the configuration workbooks, based on the operations of the configuration device 110, as described in more detail below. In an aspect, the templates may require a password and the password may be provided to the configuration device 110 via the user interface along with the other parameters described herein. In an aspect, the templates may include multiple functional areas (e.g., different portions of the template may be associated with different targets or compliance requirements) and the user may specify one or more of the functional areas via inputs provided to the graphical user interface. The configuration workbooks may include information associated with processes, policies, or other types of data descriptive of an aspect of an entities operations. A non-limiting example of data that may be included in a configuration workbook is described in more detail below with reference to FIGS. 2A, 2B. The mapping data may include information that may be used during automated generation of advance loads to map information from the configuration workbook to the templates.

In an aspect, one or more of the inputs configured via the graphical user interface may include multiple sheets (e.g., similar to different sheets in an Excel file or tabs in a web browser). The graphical user interface may be configured to analyze the files designated by the user, such as the above-described configuration workbooks, the mapping data, or other inputs, and display the various sheets as selectable elements within the graphical user interface. For example, the graphical user interface may present selectable elements corresponding to different sheets included in the mapping data and the user may select one or more of the sheets for use by the configuration device 110. For example, a single configuration workbook may be utilized to configure multiple templates and the user may utilize the selectable sheets to associate different mapping sheets with different templates or to select a particular template for use by the configuration device 110. It is noted that where files including multiple sheets are utilized by the configuration device 110, the control information may also include parameters for requiring all open sheets be closed (e.g., upon concluding operations of the configuration device 110).

The compliance data may enable the user to specify one or more requirements to be used for compliance verification. In an aspect, the compliance data may be specified by the user via a dropdown menu that may display all or a subset of the requirements stored in the requirements database, and the user may select one or more of the requirements to be used for compliance verification. In some aspects, the user interface may provide additional controls for filtering or otherwise limiting the set of requirements from which the user selects, such as to filter by country (i.e., limit the selectable requirements to a particular geographic region, such as a country, a state, etc.) or some other criterion.

The graphical user interface may also include an interactive element, such as a button, that the user may activate (e.g., by clicking on the button) to execute various operations of the configuration device 110 in accordance with the set of parameters configured via the graphical user interface. For example, once the above-described parameters are configured, the user may activate the interactive element, which may activate the modelling module 124. The modelling module 124 may include machine learning models and functionality for conditioning the information input by the user to a format that is compatible with the machine learning model. As will be described in more detail below, the machine learning model may be configured to analyze at least a portion of the information input by the user for requirements compliance and to generate one or more recommendations for modifying the information based on the requirements analysis.

In an aspect, the conditioning functionality of the modelling module 124 may include various processes for processing text, such as tokenization, lemmatization and stemming (e.g., removing suffixes from words, such as to remove "ing", "ed", or other suffixes from words present in the input data 202, and the like), sentence segmentation (e.g., dividing the input data into component sentences), and the like. During the tokenization process, text data may be broken up into individual words and each individual word may represent a token. Using segmentation, sentence tokens may also be generated, where a sentence token may be associated with multiple word tokens (e.g., the tokens representing the words of the sentence). Once the sentence tokens and word tokens are created, the sentence and word tokens may be subjected to a vectorization process. During vectorization, each of the word and sentence tokens may be converted to a numerical representation (e.g., the word "welder" may be converted to a numeric value, such as 0.73). Through the various data conditioning processes of the modelling module 124, various types of information may be processed to a format that is compatible with the machine learning model(s). For example, the configuration workbook provided by the user may be subjected to the above-described conditioning processes to generate data that enables the model(s) of the modelling module 124 to analyze the configuration workbook for compliance with one or more requirements specifications.

In an additional or alternative aspect, the model(s) of the modelling module 124 may perform conditioning of the data. For example, the model(s) may include an artificial neural network configured to analyze a corpus of text (e.g., the configuration workbook) and other data (e.g., guidance generated by an entity or organization, regulatory requirements, etc.) and may produce vectorized data that defines a vector space. The vector space may provide a semantic mapping that enables classification to be performed based on words in the corpus of text, applicable requirements, guidance from industry groups or internal guidance from an entity or think tank, and other types of data. For example, once the corpus of text and other materials are ingested into the model, the vector space may enable identification of components of the corpus to be associated with requirements and classifications to be performed based on those associations, such as to determine whether portions of the configuration workbook (e.g., the corpus of text) comply with applicable requirements. Using the above-described data conditioning processes may enable the models to automatically and intelligently utilized both structured data (e.g., data of the configuration workbooks) and unstructured data (e.g., requirements files, industry guidance and best practices, etc.) to perform requirements compliance in accordance with the concepts disclosed herein.

The one or more models of the modelling module 124 may include deep learning models. As a non-limiting example, the deep learning models may include a pre-trained model and a fine-tuned model including artificial neural networks. The pre-trained model(s) may include models that were trained on a training dataset, such as a historic dataset containing a plurality of configuration workbooks covering a variety of use cases and requirements. Once training of the model(s) is complete, the pre-trained model may be incorporated into the modelling module 124 to provide a base level of intelligence to the modelling module 125. In particular, by training the pre-trained models on a training dataset that contains historic data covering a wide range of use cases, the pre-trained model may serve as a base or generic model for analyzing configuration workbooks for requirements compliance.

Transfer learning may then be utilized to produce the fine-tuned model(s) based on the pre-trained model. During transfer learning, one or more layers of the pre-trained model, such as a classification layer, may be replaced with one or more new layers (e.g., a classifier layer for a specific set of requirements or a specific use case). In an aspect, the layers removed from the pre-trained model may be replaced with rectified linear unit (ReLU) and/or Pre-ReLU layers. Replacing the one or more layers of the pre-trained model with the ReLU and Pre-ReLU layer(s) may tune the pre-trained model to more accurately perform classification (e.g., evaluate requirements compliance) for a specific use case associated with a configuration workbook (e.g., a configuration workbook provided by the user of the user device 150) submitted to the configuration device 110 for compliance requirements analysis. For example, the pre-trained model may be a deep learning model trained on a broad set of related inputs that include unstructured data. For a particular use case, the set of requirements may cover many different types of requirements, and only a portion of the requirements may be applicable to the particular use case. The ReLU and Pre-ReLU layers may operate as a set of activation functions to activate a set of neurons of the neural network that are applicable to the particular use case under consideration and parameterize the activation process to provide a better channelized response, thereby enabling the model to be tuned to different compliance use cases by utilizing different ReLU and Pre-ReLU layers. In this manner, the layers of the fine-tuned model corresponding to the pre-trained model may provide for intelligent feature extraction while the new layers (e.g., the layers replacing those removed from the pre-trained model) may then provide for classification of the features on a set of classes appropriate for the particular configuration workbook being analyzed.

Using the above-described models, a configuration workbook provided by a user may processed using the pre-trained model, which may be used to identify a set of features that are useful for classification purposes with respect to requirements compliance. Subsequently, the configuration workbook may be analyzed by the fine-tuned model having different classification layers than the pre-trained model (e.g., the above-described ReLU and/or pre-ReLU layers) to perform requirements compliance analysis. Based on analysis by the fine-tuned model, one or more recommendations may be generated. For example, the recommendations may indicate that one or more portions of the configuration workbook are not in compliance with applicable requirements (e.g., the requirements specify a range of values for a particular feature of the configuration workbook and the configuration workbook provides a range of values that is different than that of the requirements). In an aspect, the recommendations output by the modelling module 124 may be derived by the model(s) based on information used to train the pre-trained model, such as guidance information. The model outputs may also indicate and portions of the configuration workbook that are missing, data mismatches, or other errors.

The recommendations may be presented to a user and the user may be provided with an opportunity to correct any errors and/or apply the recommendations. Once the configuration workbook has been modified based on the recommendations, the above-described process may be re-executed on the modified configuration workbook to verify requirements compliance. If the user elects to not implement changes to the configuration workbook based any or all of the recommendations provided by the modelling module 124, or once the configuration workbook is determined to be in compliance, the current configuration workbook (e.g., the modified configuration workbook or the original configuration workbook if no changes were made) may be provided to the loading module 126.

The loading module 126 may be configured to generate populated templates based on the templates provided by the user, the configuration workbook (e.g., the configuration workbook subsequent to processing by the modelling module 124), and the mapping data. Prior to generating the populated templates, the loading module 126 may perform various data validation and preparation processes. For example, the loading module 126 may verify that all required inputs have been provided (e.g., the configuration workbook(s), mapping data, and templates) and that the correct inputs have been provided (e.g., the mapping data may contain information for validating compatibility of the configuration workbook and template). The validation operations may also verify the file structure of one or more input files, such as the templates and check that interdependencies are validated. In an aspect, verification of the template may also involve validating credentials (e.g., a password for accessing the target application, module, service, etc. of the cloud-based system) provided by the user. The verification processes may also be configured to verify the correct template(s) has been provided by the user, or other types of validations. Checks are in place to ensure all the required input files are provided as an intended. As an example—the configuration workbook, mapping document and advanced load templates are provided. Additionally there are checks to ensure the interdependency are adequately validated. For example the mapping document contains the advanced load template, configuration workbook and validations are in place to ensure the same advanced load template is uploaded as input by the user.

In an aspect, the loading module 126 may also obtain reference identifiers (IDs) from the cloud-based system. For example, the reference IDs may be obtained using one or more APIs (and credential information supplied by the user). For example, the APIs may be configured to retrieve reference IDs from a target application, module, or other component or service of the cloud-based system. The reference IDs may be used to select loading templates for loading by the loading module 126. For example, each loading template may be associated with a particular reference ID and the corresponding application, module, or other component or service of the cloud-based system, which may enable the loading module 126 to verify that the template corresponding the target of interest is selected for loading. In retrieving the reference IDs from the cloud-based system, the loading module 126 may be configured to authenticate itself to the cloud-based system using credential information provided by the user (e.g., credential information provided as one of the parameters input via the above-described graphical user interface).

After the reference IDs are obtained, the loading module 126 may perform data validation and transformation using the mapping data received from the user (e.g., as one of the parameters input via the above-described graphical user interface). Data validation operations provided by the loading module 126 may include verifying that all files and data needed to perform loading of the template is available. For example, to populate a template the loading module 126 may utilize the above-described mapping file(s) and the configuration workbook. The data validation operations may be configured to verify that all of necessary information is available. Moreover, the user may have specified (e.g., via the above-described graphical user interface) one or more sheets within the mapping data that are to be used by the load automation engine 120. The loading module 126 may access the mapping data and verify that the sheets specified by the user are present. The validation operations may also validate characteristics of the data included in the configuration workbook. As a non-limiting example, the data of the configuration workbook may be analyzed to ensure the data is populated and arranged as expected (e.g., verifying column headers for tabular data are present and labeled as expected, data in each column is populated, etc.), data types of the data provided in the configuration workbook are correct, verify expected values are present or if the data is different than expected, and the like. Such validations may be used to ensure basic errors are detected in the initial phase of the run itself and enable the run to be stopped if errors are found (or a threshold number of errors), which may reduce time wasted processing an incomplete or error filled configuration workbook that may provide unreliable results. It is noted that the exemplary validation operations described above have been provided for purposes of illustration, rather than by way of limitation and that the loading module 126 may be configured to perform other types of validation operations in preparation for loading data from the configuration workbook to the template(s).

In an aspect, the mapping data provided by the user may include transformation rules for transferring data included in the configuration workbook to a template. For example, the transformation rules may include rules that specify and acronym (e.g., "USA") in the configuration workbook should be expanded to "United States" when incorporated into appropriate portions of the template or vice versa (e.g., "United States" should be converted to "USA" when incorporated into the template). The mapping data may include other types of information and rules that may be used to map and/or transform data of the configuration workbook to an appropriate format for incorporation into the template. For example, data from the configuration workbook may be transformed from uppercase to lowercase, data may be abbreviated (e.g., Male to M or Female to F) or abbreviations expanded (e.g., M to Male and F to Female), and the like, which may ensure a consistent format for the data loaded into the template from the configuration workbook(s). The transformations and mapping may also be configured to perform other types of data transformations, such as append or suffix any specific value or multiple columns (e.g., concatenate First Name, Last Name), etc. It is noted that the exemplary transformations described above have been provided for purposes of illustration, rather than by way of limitation and that the loading module 126 may be configured to perform other types of transformations in preparation for loading data from the configuration workbook to the template(s).

After the data transformations are complete, the loading module 126 may be configured to perform post-validation operations based on the transformed data. During post-validation operations, dependencies, parent-child relationships, or other types of checks may be performed on the input dataset. After the various validation and transformation processes are complete, the loading module 126 may be configured to generate a runtime database, which may be a database that is instantiated by the loading module 126 to facilitate loading of data from the configuration workbook(s) to one or more templates and which may be deleted upon completion of the template loading (i.e., the configuration device 110 maintains no residual data from the runtime database(s) after a template loading session is complete). In an aspect, the runtime database may be configured to organize the data from the configuration workbook. For example, the loading module 126 may determine a set of hierarchical relationships (e.g., parent-child relationships) for the data of the workbook(s), which may be based, at least in part, on the loading template(s). The hierarchical relationships may be utilized to identify data dependencies. Using the identified dependencies and the mapping data, the loading module 126 may segregate the data of the configuration workbook according to different sheets (e.g., if multiple loading template(s) are involved) or to segregate data for a single sheet if a single loading template is involved). The segregated data may be stored in the runtime database as one or more tables (e.g., one table per template or sheet). Once the data from the configuration workbook has been segregated into the appropriate sheets or table in accordance with the mapping data and dependencies, the loading module 126 may populate each template by reading data from the corresponding database table(s). The loading module 126 may be configured to maintain a log of the various processes described above. For example, the log may contain information associated with each of the above-described functionalities of the loading module 126 and may record details associated with whether each of those functionalities completed successfully or if any errors were encountered. For example, if a sheet of the template could not be found during the pre- or post-validation operations, information indicting the missing sheet may be recorded to the log. The log may also record information associated with any errors encountered with respect to data of the configuration workbook (e.g., errors encountered during the validation/transformation operations or based on dependencies, such as data for a parent or child is missing). It is noted that the exemplary errors that may be recorded to the log maintained by the loading module 126 have been provided for purposes of illustration, rather than by way of limitation and that other types of information may be recorded to the log. As a non-limiting example, while the logged information described above relates to errors encountered by the loading module 126, the log may also record information that indicates successful operations (e.g., all transformations completed successfully, all required template sheets present, and the like).

Once populated, the loading module 126 may transmit or otherwise provide the populated template to a user. For example, where the user accesses the functionality of the configuration device 110 over network 160 using the user device 150, the loading module 126 may transmit the populated template to, or enable the user to download the populated template to, the user device 150 over the network 160. Once obtained by the user, the populated template may be utilized to configure migration of an application 172 provided by entity device 170 to a cloud environment. For example, the populated template may be utilized to configure at least a portion of a cloud-based application 164. Moreover, using the above-described techniques, the user may generate multiple templates and utilize the templates to configure the entirety of the cloud-based application 164 and/or other cloud-based services, modules, and the like. In this manner, the configuration device 110 may enable migration of services, applications, and other functionality from a local deployment (e.g., deployment resident on one or more servers or other computing devices of entity device 170) to a cloud-based deployment in a more efficient manner. It is also noted that the application 172 to the cloud-based application 164 may be the same application or different applications.

Using the above-described processes and functionality of the configuration device 110 may enable users to realize a significant decrease in the amount of time spent configuring migrations from local to cloud-based deployments. To illustrate, as explained above, current efforts to manually perform advanced loads may require two hundred and forty hours per module. However, performing the same number of advanced loads using loading templates populated using the configuration device 110 may reduce the load time to approximately eighty hours, resulting in a substantially faster loading time. Thus, the configuration device 110 enables migration of applications and services to cloud-based environments to be performed more quickly. In addition to improved time requirements, other advantages may be realized by using loading templates populated using the automated techniques provided by the configuration device 110. For example, by leveraging the models of the modelling module 124, regulatory compliance issues may be resolved quickly and accurately, thereby improving the requirements compliance of the functionality being migrated to the cloud. Furthermore, utilizing the machine learning models of the modelling module 124 may also enable changes to the cloud-based environment to be performed quickly when changes to the requirements occur. For example, when a change in applicable requirements occurs, the above-described functionality of the configuration device 110 may be executed using the new requirements and one or more new loading templates may be generated in a substantially or completely automated manner. Once the new loading template(s) is generated, it may be used to configure applicable modules or applications of the cloud-based environment to achieve compliance with the changes to the requirements.

Figure 2A:
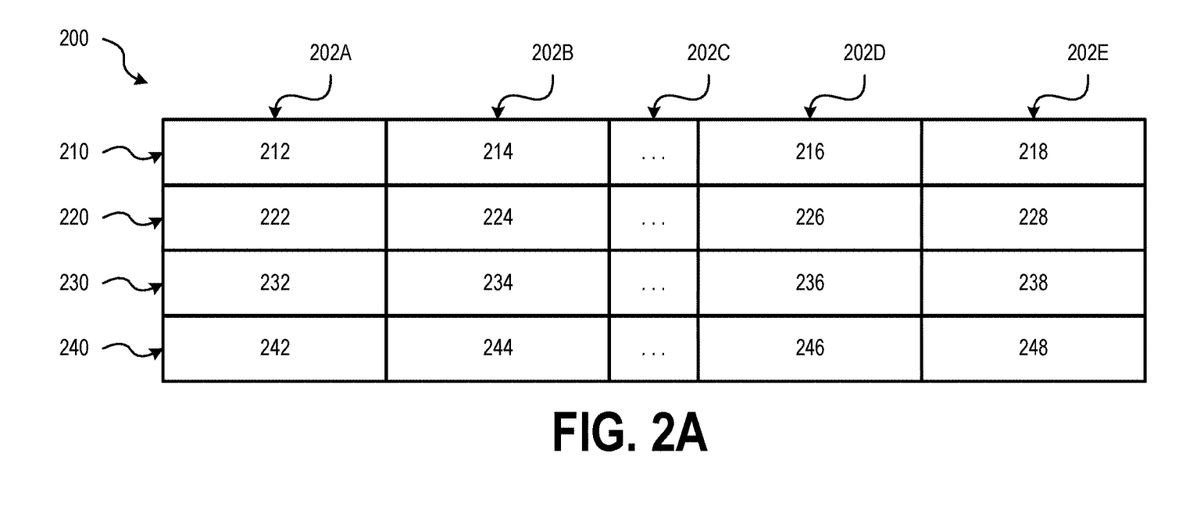
FIG. 2A shows a block diagram illustrating exemplary aspects of analyzing configuration workbook requirements compliance in accordance with aspects of the present disclosure.
Figure 2B:
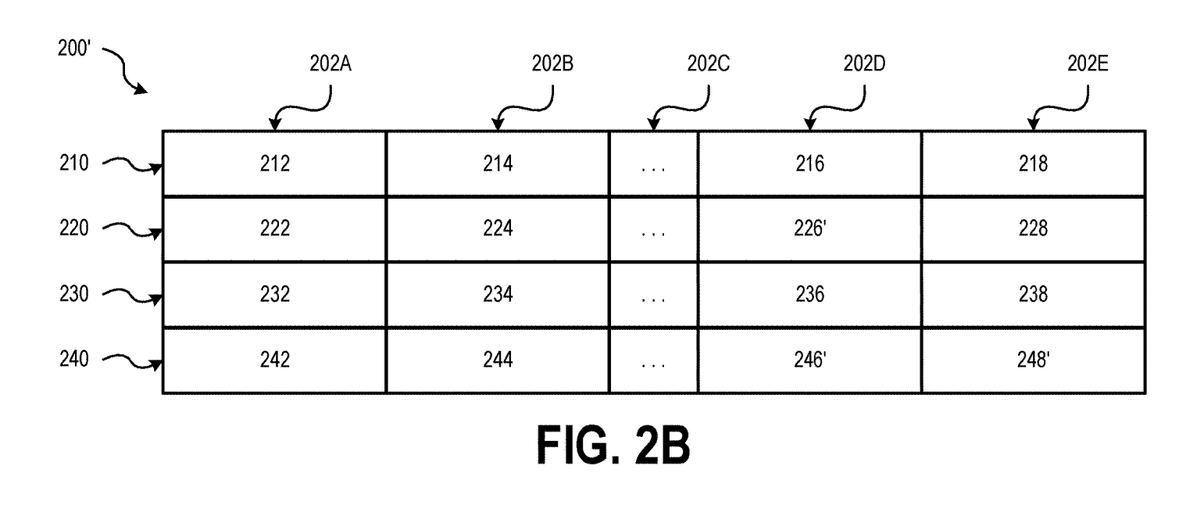
FIG. 2B shows another block diagram illustrating exemplary aspects of analyzing configuration workbook requirements compliance in accordance with aspects of the present disclosure.

Referring to FIGS. 2A and 2B, block diagrams illustrating exemplary aspects of analyzing configuration workbook requirements compliance in accordance with aspects of the present disclosure are shown. Referring to FIG. 2A, a configuration workbook 200 is shown. The configuration workbook 200 of FIG. 2A includes a data grid that includes data arranged into a plurality of columns 202A, 202B, 202C, 202D, 202E and a plurality of rows 210, 220, 230, 240. In a non-limiting example, the data grid of the configuration workbook 200 may be a spreadsheet or other type of document. Although not explicitly shown in FIG. 2, it is to be understood that the configuration workbook 200 may include multiple sheets, as explained above. Each sheet of the configuration workbook 200 may include information or data arranged in a data grid. It is noted that each sheet may include different types of data, as well as different numbers of columns and rows. In FIG. 2A, the row 210 of the data grid may contain header information, such as information that describes the data stored in the cells of a particular column. For example, cell 212 may be a header describing the information stored in column 202A (e.g., in cells 222, 232, 242, etc.), cell 214 may be a header describing the information stored in column 202B (e.g., in cells 224, 234, 244, etc.), cell 216 may be a header describing the information stored in column 202D (e.g., in cells 226, 236, 246, etc.), cell 218 may be a header describing the information stored in column 202E (e.g., in cells 228, 238, 248, etc.), and one or more cells of row 210 corresponding to cell(s) 202C may be headers describing the information stored in the corresponding column(s) 202C. It is noted that the specific number of columns and rows shown in FIG. 2A is provided for purposes of illustration, rather than by way of limitation and that configuration workbooks utilized by embodiments of the present disclosure may include any number of rows and columns.

In the above-described format, each column may represent a different piece or type of data within the data grid. For example, suppose the headers 212-218 included the following entries, respectively: Country; Grade Profile; . . . ; Range; and Hours. With such a header configuration, it can be appreciated that the various cells of column 202A below the header (e.g., cell 212) may include information that identifies a country (e.g., India, United Kingdom, United States, etc.); the various cells of column 202B below the header (e.g., cell 214) may include information that identifies a worker classification (e.g., Welder, Technician, Drilling Technician, etc.); the various cells of column 202D below the header (e.g., cell 216) may include information that identifies a pay range (e.g., minimum/mean/maximum, or these metrics may be broken out across multiple columns); the various cells of column 202E below the header (e.g., cell 218) may include information that identifies a number of hours worked per week (e.g., 45, 60, 35, 20, etc.). A configuration workbook such as the one described above may be utilized to evaluate aspects of a human resources (HR) system for regulatory and guidance compliance for an entity that has various employees across the countries indicated in column 202A, where the employees have different types of jobs or roles (e.g., column 202B) within the entity (e.g., welders, technicians, drilling technicians, etc.) and each different type of job may have a different pay range (e.g., column 202D) and a particular number of hours the employees are expected to work per week (e.g., column 202E).

Prior to migrating the HR system to a cloud environment (e.g., application 164 of FIG. 1), a user (e.g., a user of the user device 150 of FIG. 1) may access a configuration device (e.g., the configuration device 110 of FIG. 1) and provide various inputs for evaluating compliance of the HR configuration workbook. In this non-limiting example, the configuration workbook represents the configuration of at least a portion of the HR system and the configuration device is being utilized to evaluate whether the portion of the HR system represented by the configuration workbook complies with one or more sets of requirements. It is noted that while FIG. 2A illustrates only four rows (e.g., the row 210 containing header data and three data rows 22, 230, 240), configuration workbooks utilized in real-world examples may contain multiple sheets, each sheet containing hundreds, thousands, or even tens of thousands of rows for which requirements compliance must be performed. Moreover, the requirements compliance may span across multiple jurisdictions (e.g., the various countries of column 202A) and the various values in each of the columns may vary from one jurisdiction to the next, resulting in a complex requirements compliance problem that may be a significant undertaking using prior manual techniques. As can be appreciated from the description above with reference to FIG. 1, such complex problems may be readily solved using the functionality provided by the configuration device and concepts disclosed herein.

For example, the configuration workbook 200 may be fed as an input to the pre-trained and fine-tuned models of the modelling module 124, as described above. As described above, the models may analyze one or more sheets of the configuration workbook 200, such as the exemplary data described above with reference to FIG. 2A, for requirements compliance. Analysis of the sheet(s) of the configuration workbook using the model(s) may produce recommendations for improving the requirements compliance of the configuration workbook. To illustrate, FIG. 2B shows a configuration workbook 200', which represents an instance of the configuration workbook 200 of FIG. 2A following analysis by the modelling module 124. As described above, the analysis of the configuration workbook 200 of FIG. 2A by the models may result in recommendations. In this illustrative example, suppose the recommendations correspond to the information recorded in cells 226, 246, 248 of FIG. 2A, where the cells 226, 246 contain information that identifies a pay range (e.g., minimum/mean/maximum, or these metrics may be broken out across multiple columns) and the cell 248 contains information that identifies a number of hours worked per week (e.g., 45, 60, 35, 20, etc.). During the analysis by the model, it may be determined that one or more aspects of the pay range information of cells 226, 246 do not comply with applicable requirements (e.g., a minimum pay or maximum pay fall outside of a range specified in the requirements or other guidance, such as guidance from an industry group or the entity associated with entity device 170), or the pay range information of cells 226, 246 may be close to edge compliance cases for compliance (e.g., a minimum pay and/or a maximum pay are close to the minimum and/or maximum permitted by requirements or other guidance). The models may also flag the information in cell 248 for potential requirements compliance issues, such as the hours per week being above or below a number of hours deemed acceptable by the requirements or other guidance.

During analysis, the models may identify the issues described above with reference to cells 226, 246, 248, and may output one or more recommendations to the user. For example, the recommendations may identify one or more issues related to the contents of cells 226, 246, 248. Using the exemplary issues described above for example, the recommendations may indicate a pay parameter (e.g., minimum pay, mean pay, maximum pay) of cells 226, 246 are outside of tolerable levels specified in the requirements or other guidance and may indicate adjustments that may be made to bring those values into compliance. In some aspects, the recommendations may include warnings, which may indicate that the information contained in a cell is compliant but could be problematic (e.g., mean pay and maximum pay values are in compliance but minimum pay is below recommended levels of the requirements or other guidance). Similarly, recommendations may indicate that the hours per week specified in cell 248 are higher (or lower) than an amount of hours recommended in the requirements or other guidance.

The recommendations may be presented to a user and the user may be afforded an opportunity to make adjustments to the configuration workbook 200 based on the recommendations, thereby producing the updated configuration workbook 200' shown in FIG. 2B. In particular, as compared to the configuration workbook 200 of FIG. 2B, the configuration workbook 200' of FIG. 2B includes different values for the cell 226, 246, 248, as shown by cells 226', 246', and 248'. Once the updated configuration workbook 200' is produced, it may be subjected to analysis by the models and this time, the configuration workbook may be determined to be compliance with the applicable requirements. Following confirmation that the updated configuration workbook 200' is in compliance, the configuration workbook 200' may be utilized in connection with other functionality of the configuration device 110, such as the functionality described above with reference to the loading module 126 for generating advanced loading templates populated with data derived from or extracted from the configuration workbooks. The populated templates may then be used to configure portions of a cloud-based system in a manner that ensures requirements compliance.

It is noted that the exemplary types of compliance described with reference to the configuration workbooks 200, 200' (e.g., requirements compliance for human resources system configurations related to payment of workers and hours requirements) and the recommendations that may be output by the machine learning models in accordance with the concepts disclosed herein have been provided for purposes of illustration, rather than by way of limitation. Accordingly, it is to be understood that the functionality provided by configuration devices in accordance with the present disclosure may be applied to other use cases involving requirements compliance analysis. For example, the requirements compliance capabilities and generation or loading of templates may be readily applied to deployment of other types of services, applications, and modules in a cloud-based environment, such as cloud-based environments involving cybersecurity, data privacy, and/or medical records tools, applications, modules, and the like. Moreover, the functionality provided by the configuration devices and techniques disclosed herein may also be applied to non-requirements compliance use cases, such as cases involving transformation of cloud objects to load configurations, which may enable changes in the configuration templates and load templates to be implemented more quickly and for systems, functionality, and changes to be migrated or deployed to cloud-based environments more rapidly.

Figure 3:
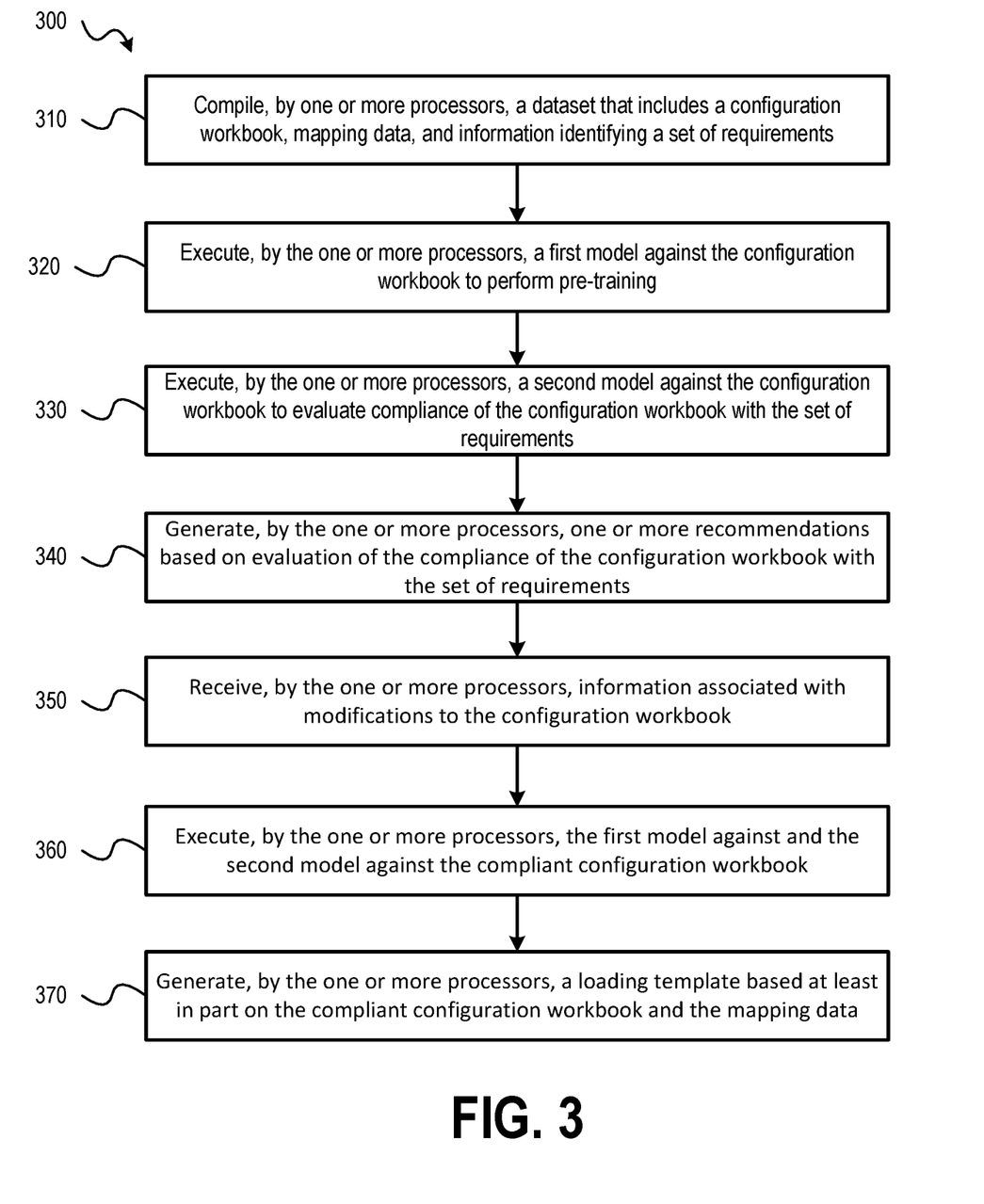
FIG. 3 is a flow diagram illustrating an example of a method for configuring cloud-based systems according to one or more aspects of the present disclosure.

Referring to FIG. 3, a flow diagram of an example of a method for configuring cloud-based functionality according to one or more aspects of the present disclosure is shown as a method 300. In some implementations, the operations of the method 300 may be stored as instructions (e.g., the instructions 116 of FIG. 1) that, when executed by one or more processors (e.g., the one or more processors 112 of the configuration device 110 or processors of the configuration device 162 of FIG. 1), cause the one or more processors to perform the operations of the method 300. In some implementations, the method 300 may be performed by a computing device, such as the configuration device 110 of FIG. 1, the cloud-based configuration device 162 of FIG. 1, the user device 150 of FIG. 1 (e.g., for implementations where the functionality of the configuration device 110 is provided as software that may be executed on various types of computing devices), or a combination thereof.

At step 310, the method 300 includes compiling, by one or more processors, a dataset that includes a configuration workbook, mapping data, and information identifying a set of requirements. In an aspect, the dataset may be compiled via a graphical user interface, such as the graphical user interface described above with reference to FIG. 1. In addition to the configuration workbook, the mapping data, and the information identifying the set of requirements, the dataset may include information identifying cloud-based functionality of interest (e.g., applications, modules, etc. to be configured in a cloud environment), credential information (e.g., information for accessing the cloud-based environment to obtain reference IDs, information specifying particular sheets of the configuration workbook(s) and/or the mapping data, or other types of information, as described above with reference to FIG. 1. In addition to compiling the dataset, the graphical user interface may be configured to receive other types of runtime parameters, such as the privacy parameters and other parameters described above with reference to FIG. 1.

The method 300 includes, at step 320, executing, by one or more processors, a first model against the configuration workbook to perform pre-training and at step 330, executing, by one or more processors, a second model against the configuration workbook to evaluate compliance of the configuration workbook with the set of requirements. As described above with reference to FIG. 1, the second model may include a set of layers derived from the first model and at least one additional layer. For example, the set of layers derived from the first model may include an artificial neural network of the first model, and the at least one additional layer may be configured to fine-tune the set of layers derived from the first model. For example, the first model may be a pre-trained model and the artificial neural network of the pre-trained model may be utilized to generate the second model through transfer learning. Since the pre-trained model may represent a general model for analyzing requirements compliance, one or more layers of the pre-trained model (e.g., layers other than the neural network) may be replaced with layers fine-tuned for a particular use case involving requirements compliance, such as a use case applicable to the configuration workbook(s) of the compiled dataset. In an aspect, the one or layers used to replace the layers removed from the pre-trained model may include ReLU layers and/or pre-ReLU layers, as described above. The artificial neural network, having been pre-trained on a wide variety of requirements compliance use cases may provide sufficient feature identification, and the fine-tuning layers (e.g., the ReLU layer and/or the pre-ReLU layer) may serve as a classifier for the particular use cases associated with the configuration workbook(s) of the compiled dataset. In this manner, the fine-tuning enables the second model to accurately evaluate the configuration workbook(s) for compliance with the applicable requirements (e.g., because the fine-tuning may be more directly applicable to the requirements for which the configuration workbook(s) is being evaluated for compliance).

At step 340, the method 300 includes generating, by one or more processors, one or more recommendations based on evaluation of the compliance of the configuration workbook with the set of requirements. As described above with reference to FIGS. 1-2B, the one or more recommendations may be configured to improve a level of compliance of the configuration workbook with respect to the set of requirements. At step 350, the method 300 includes receiving, by one or more processors, information associated with modifications to the configuration workbook. As described above with reference to FIGS. 1-2B, the modifications may correspond to changes to the configuration workbook based on the one or more recommendations and may produce a compliant (or at least more compliant) configuration workbook. At step 360, the method 300 includes executing, by one or more processors, the first model against and the second model against the compliant configuration workbook. Performing a second execution of the first and second models against the compliant configuration workbook may serve to verify that the configuration workbook is in compliance with the requirements. For example, following step 360, the method 300 may validate a level of compliance of the compliant configuration workbook with respect to the requirements. If issues are detected during the second execution of the first and second models, additional recommendations may be generated to improve the level of compliance for the (compliant) configuration workbook and steps 350, 360 may be repeated until an acceptable level of compliance is achieved.

At step 370, the method 300 includes generating, by one or more processors, a loading template based at least in part on the compliant configuration workbook and the mapping data. In an aspect, the loading template may be generated in response to a determination that the level of compliance of the configuration workbook satisfies a threshold level. As described above, the loading template may include information for configuring the cloud-based functionality. In some aspects, the method 300 may include deploying the loading template to a cloud-environment to configure the cloud-based functionality. In additional or alternative aspects, the loading template may be transmitted to a user, such as a user of the user device 150 of FIG. 1.

It is noted that while the method 300 has been described as including particular functionality, it should be understood that the method 300 may include any of the functionality described herein. For example, the method 300 may perform any of the functionality and operations described above with reference to the configuration device 110 and the system 100, as well as the configuration workbooks of FIGS. 2A-2B. Furthermore, while the method 300 is described with reference to a single configuration workbook, it should be understood that the method 300 may be utilized to perform compliance analysis with respect to a plurality of configuration workbooks and may generate a plurality of loading templates. To ensure that appropriate templates are loaded, the method 300 may also retrieve reference IDs from the cloud-environment where the loading templates are to be deployed, and in some cases, from the cloud-based functionality directly via authentication of credential information supplied by a user. When multiple configuration workbooks are evaluated using the method 300, additional models may be utilized. For example, the pre-trained model may be used to perform pre-training and then multiple second models may be used to evaluate the configuration workbooks for compliance. Each of the multiple second models may include the artificial neural network of the pre-trained model, but may have different fine-tuned layers (e.g., ReLU layers and/or pre-ReLU layers) applicable to the compliance requirements of each configuration workbook.

The configuration of cloud-based functionality using the method 300 and/or the system 100 of FIG. 1 may be particularly well suited for migrations, where data and functionality of a local system (e.g., the entity system 170 of FIG. 1) is being migrated to a cloud-based environment. Using the above-described techniques, deployment and configuration of cloud-based functionality may be streamlined and optimized. Moreover, through utilization of the machine learning models for requirements compliance analysis and the loading of the templates based on the mapping data, the compliance of the configured cloud-based functionality may be improved as compared to prior techniques. It is noted that while particular benefits and advantages have been described herein, other advantages may also be provided by embodiments of the present disclosure, as will be appreciated by one or ordinary skill in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-3) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for configuring cloud-based functionality, the method comprising:
    compiling, by one or more processors, a dataset that includes a configuration workbook, mapping data, and information identifying a set of requirements;
    executing, by the one or more processors, a first model against the configuration workbook to perform pre-training;
    executing, by the one or more processors, a second model against the configuration workbook to evaluate compliance of the configuration workbook with the set of requirements, the second model comprising a set of layers derived from the first model and at least one additional layer, the at least one additional layer configured to fine-tune the set of layers derived from the first model;
    generating, by the one or more processors, one or more recommendations based on evaluation of the compliance of the configuration workbook with the set of requirements, the one or more recommendations configured to improve a level of compliance of the configuration workbook with respect to the set of requirements;
    receiving, by the one or more processors, information associated with modifications to the configuration workbook, the modifications corresponding to changes to the configuration workbook based on the one or more recommendations to produce a compliant configuration workbook; and
    generating, by the one or more processors, a loading template based at least in part on the compliant configuration workbook and the mapping data, wherein the loading template comprises information for configuring the cloud-based functionality.

2. The method of claim 1, further comprising configuring the cloud-based functionality based on the loading template to produce requirements compliance cloud-based functionality.

3. The method of claim 1, wherein the set of layers comprise an artificial neural network of a pre-trained model, and wherein the at least one additional layer comprises a rectified linear unit (ReLU) layer.

4. The method of claim 3, wherein features of the configuration workbook are identified by the artificial neural network and the features are classified by the ReLU layer.

5. The method of claim 1, further comprising generating a runtime database based at least in part on the mapping data, wherein the runtime database organizes data extracted from the configuration workbook into a hierarchical data structure, the extracted data corresponding to the information for configuring the cloud-based functionality.

6. The method of claim 5, further comprising deleting the runtime database subsequent to generating the loading template.

7. The method of claim 1, further comprising:
    executing each of the first model and the second model against the compliant configuration workbook; and
    validating a level of compliance of the compliant configuration workbook with respect to the set of requirements, wherein generation of the loading template based at least in part on the compliant configuration workbook and the mapping data occurs subsequent to executing each of the first model and the second model against the compliant configuration workbook.

8. The method of claim 1, further comprising:
    validating information included in the configuration workbook;
    transforming at least a portion of the information included in the configuration workbook based on the mapping data; and
    logging status information that indicates a success or failure of the validating of the information included in the configuration workbook, the transforming, and the generating of the loading template.

9. A system for configuring cloud-based functionality, the system comprising:
    a memory; and
    one or more processors communicatively coupled to the memory, the one or more processors configured to:
        compile a dataset that includes a configuration workbook, mapping data, and information identifying a set of requirements;
        execute a first model against the configuration workbook to perform pre-training;
        execute a second model against the configuration workbook to evaluate compliance of the configuration workbook with the set of requirements, the second model comprising a set of layers derived from the first model and at least one additional layer, the at least one additional layer configured to fine-tune the set of layers derived from the first model;
        generate one or more recommendations based on evaluation of the compliance of the configuration workbook with the set of requirements, the one or more recommendations configured to improve a level of compliance of the configuration workbook with respect to the set of requirements;
        receive information associated with modifications to the configuration workbook, the modifications corresponding to changes to the configuration workbook based on the one or more recommendations to produce a compliant configuration workbook;
        execute the first model against and the second model against the compliant configuration workbook;
        validate a level of compliance of the compliant configuration workbook with respect to the set of requirements subsequent to executing the first model against and the second model against the compliant configuration workbook; and
        generate a loading template based at least in part on the compliant configuration workbook and the mapping data in response to a determination the level of compliance satisfies a threshold level, wherein the loading template comprises information for configuring the cloud based functionality.

10. The system of claim 9, wherein the one or more processors are adapted to configure the cloud-based functionality based on the loading template to produce requirements compliance cloud-based functionality.

11. The system of claim 9, wherein the first-set of layers comprise an artificial neural network of a pre-trained model, and wherein the at least one additional layer comprises a rectified linear unit (ReLU) layer.

12. The system of claim 11, wherein the artificial neural network is configured to identify features from the configuration workbook and the ReLU layer is configured to classify the features.

13. The system of claim 9, further comprising generating a runtime database based at least in part on the mapping data, wherein the runtime database organizes data extracted from the configuration workbook into a hierarchical data structure, the extracted data corresponding to the information for configuring the cloud-based functionality.

14. The system of claim 13, the one or more processors configured to delete the runtime database subsequent to generating the loading template.

15. The system of claim 9, wherein the one or more processors are configured to:
validate information included in the configuration workbook;
transform at least a portion of the information included in the configuration workbook based on the mapping data; and
log status information that indicates a success or failure of the validation of the information included in the configuration workbook, the transformation, and the generation of the loading template.

16. A non-transitory computer-readable storage medium storing instructions that, when executed by one or more processors, cause the one or more processors to perform operations for configuring cloud-based functionality, the operations comprising:
executing a first model against a configuration workbook;
executing a second model against the configuration workbook to evaluate compliance of the configuration workbook with a set of requirements, the second model comprising a set of layers derived from the first model and at least one additional layer, the at least one additional layer configured to fine-tune the set of layers derived from the first model;
generating one or more recommendations based on evaluation of the compliance of the configuration workbook with the set of requirements, the one or more recommendations configured to improve a level of compliance of the configuration workbook with respect to the set of requirements;
receiving information associated with modifications to the configuration workbook, the modifications corresponding to changes to the configuration workbook based on the one or more recommendations to produce a compliant configuration workbook;
execute the first model against and the second model against the compliant configuration workbook; and
generating a loading template based at least in part on the compliant configuration workbook and the mapping data, wherein the loading template comprises information for configuring the cloud-based functionality.

17. The non-transitory computer-readable storage medium of claim 16, the operations further comprising configuring the cloud-based functionality based on the loading template to produce requirements compliance cloud-based functionality.

18. The non-transitory computer-readable storage medium of claim 16,
wherein the set of layers comprise an artificial neural network of a pre-trained model,
wherein the at least one additional layer comprises a rectified linear unit (ReLU) layer, and
wherein features of the configuration workbook are identified by the artificial neural network and the features are classified by the ReLU layer.

19. The non-transitory computer-readable storage medium of claim 16, the operations further comprising:
generating a runtime database based at least in part on the mapping data, wherein the runtime database organizes data extracted from the configuration workbook into a hierarchical data structure, wherein the loading template is populated based on the data stored in the runtime database; and
deleting the runtime database subsequent to generating the loading template.

20. The non-transitory computer-readable storage medium of claim 16, the operations further comprising:
obtaining, from a cloud-based environment, reference identifiers corresponding to the cloud-based functionality; and
selecting the loading template based at least in part on the reference identifiers.

* * * * *